(12) United States Patent
Nagao

(10) Patent No.: US 10,515,548 B2
(45) Date of Patent: Dec. 24, 2019

(54) TRANSIT VEHICLE INFORMATION MANAGEMENT SYSTEMS AND METHODS

(71) Applicant: Intertrust Technologies Corporation, Sunnyvale, CA (US)

(72) Inventor: Yutaka Nagao, Cupertino, CA (US)

(73) Assignee: Intertrust Technologies Corporation, Sunnyvale, CA (US)

(*) Notice: Subject to any disclaimer, the term of this patent is extended or adjusted under 35 U.S.C. 154(b) by 0 days.

(21) Appl. No.: 15/720,896

(22) Filed: Sep. 29, 2017

(65) Prior Publication Data

US 2018/0096599 A1 Apr. 5, 2018

Related U.S. Application Data

(60) Provisional application No. 62/402,623, filed on Sep. 30, 2016.

(51) Int. Cl.
*G08G 1/123* (2006.01)
*B61L 15/00* (2006.01)
(Continued)

(52) U.S. Cl.
CPC ............ *G08G 1/123* (2013.01); *B61L 15/009* (2013.01); *B61L 15/0027* (2013.01);
(Continued)

(58) Field of Classification Search
CPC . G08G 1/123; B61L 15/0027; B61L 15/0072; B61L 15/009; B61L 27/0077; B61L 27/0094; G06Q 10/06; G06Q 50/30
See application file for complete search history.

(56) References Cited

U.S. PATENT DOCUMENTS 5,176,082 A 1/1993 Chun et al.
5,400,020 A * 3/1995 Jones ..................... G08G 1/123
340/992
(Continued)

FOREIGN PATENT DOCUMENTS

GB 2508743 A 6/2014
WO WO-2016/023546 2/2016

OTHER PUBLICATIONS

NextBus Products Automatic Passenger Counters, Mar. 16, 2016.*
International Search Report and Written Opinion dated Dec. 22, 2017 in related International Application No. PCT/US2017/054492.

*Primary Examiner* — Quang Pham
(74) *Attorney, Agent, or Firm* — Finnegan Henderson Farabow Garrett & Dunner LLP

(57) ABSTRACT

This disclosure relates to systems and methods for managing vehicle occupancy and/or selecting and delivering content to vehicle occupants. Sensor information that may be used to estimate an occupancy of one or more vehicles, such as vehicle weight information, may be collected by a service and used to estimate a relative passenger occupancy of a vehicle and/or a number of occupants in the vehicle. Indications of estimated vehicle occupancy may be provided to prospective passengers via one or more visual displays associated with a transit station and/or mobile and/or personal electronic devices associated with the prospective passengers. Vehicle occupancy information may further be used in connection with managing advertisements displayed to occupants of a vehicle.

16 Claims, 7 Drawing Sheets

(51) Int. Cl.
*B61L 27/00* (2006.01)
*G06Q 10/06* (2012.01)
*G06Q 50/30* (2012.01)

(52) U.S. Cl.
CPC ....... *B61L 15/0072* (2013.01); *B61L 27/0077* (2013.01); *B61L 27/0094* (2013.01); *G06Q 10/06* (2013.01); *G06Q 50/30* (2013.01)

(56) References Cited

U.S. PATENT DOCUMENTS

| | | | | |
|---|---|---|---|---|
| 5,416,706 A * | 5/1995 | Hagenbuch | | G01G 19/08 |
| | | | | 177/136 |
| 5,623,260 A * | 4/1997 | Jones | | G08G 1/123 |
| | | | | 340/988 |
| 5,657,010 A * | 8/1997 | Jones | | G08G 1/123 |
| | | | | 340/988 |
| 5,668,543 A * | 9/1997 | Jones | | G08G 1/123 |
| | | | | 340/988 |
| 6,006,159 A * | 12/1999 | Schmier | | G08G 1/123 |
| | | | | 340/988 |
| 6,124,810 A * | 9/2000 | Segal | | G08G 1/20 |
| | | | | 340/441 |
| 6,313,760 B1 * | 11/2001 | Jones | | G08G 1/123 |
| | | | | 340/989 |
| 6,363,323 B1 * | 3/2002 | Jones | | G06Q 10/08 |
| | | | | 340/989 |
| 6,374,176 B1 * | 4/2002 | Schmier | | G08G 1/123 |
| | | | | 340/988 |
| 6,486,801 B1 * | 11/2002 | Jones | | G06Q 10/08 |
| | | | | 340/988 |
| 6,919,804 B1 * | 7/2005 | Cook | | G07C 9/00 |
| | | | | 340/541 |
| 7,595,740 B2 * | 9/2009 | Pechenick | | G06Q 30/0249 |
| | | | | 235/380 |
| 8,738,292 B1 * | 5/2014 | Faaborg | | G01C 21/26 |
| | | | | 701/537 |
| 9,294,878 B2 * | 3/2016 | Tian | | H04W 4/029 |
| 2002/0069017 A1 * | 6/2002 | Schmier | | G08G 1/123 |
| | | | | 701/469 |
| 2002/0070882 A1 * | 6/2002 | Jones | | G08G 1/123 |
| | | | | 340/988 |
| 2004/0044467 A1 * | 3/2004 | Laird | | G06Q 10/08 |
| | | | | 701/516 |
| 2004/0122884 A1 * | 6/2004 | Lee | | G08G 1/123 |
| | | | | 708/490 |
| 2005/0137754 A1 * | 6/2005 | Bartlett | | G08G 1/127 |
| | | | | 701/1 |
| 2007/0024440 A1 * | 2/2007 | Moran | | G08G 1/127 |
| | | | | 340/539.13 |
| 2007/0034107 A1 * | 2/2007 | Barbeau | | G01C 21/20 |
| | | | | 104/307 |
| 2008/0235138 A1 * | 9/2008 | Yokota | | G06Q 10/02 |
| | | | | 705/52 |
| 2009/0192756 A1 | 7/2009 | Bodin et al. | | |
| 2009/0203367 A1 * | 8/2009 | Pamminger | | G06Q 30/00 |
| | | | | 455/414.3 |
| 2010/0197325 A1 * | 8/2010 | Dredge | | H04W 4/029 |
| | | | | 455/456.3 |
| 2013/0285842 A1 * | 10/2013 | Ramin | | G09B 21/006 |
| | | | | 340/994 |
| 2013/0307707 A1 * | 11/2013 | Creech | | G08G 1/127 |
| | | | | 340/994 |
| 2014/0050122 A1 * | 2/2014 | Pro | | G06Q 30/0261 |
| | | | | 370/260 |
| 2014/0125355 A1 | 5/2014 | Grant | | |
| 2014/0180575 A1 * | 6/2014 | Lin | | G08G 1/123 |
| | | | | 701/465 |
| 2016/0207546 A1 * | 7/2016 | Komura | | B61D 19/00 |
| 2016/0301698 A1 * | 10/2016 | Katara | | G07B 13/02 |
| 2017/0169366 A1 * | 6/2017 | Klein | | G06Q 10/025 |
| 2017/0265040 A1 * | 9/2017 | Friedlander | | H04W 4/029 |
| 2017/0270790 A1 * | 9/2017 | Neiger | | G08G 1/127 |
| 2017/0328728 A1 * | 11/2017 | Salowitz | | G01C 21/36 |

* cited by examiner

TRANSIT VEHICLE INFORMATION MANAGEMENT SYSTEMS AND METHODS

RELATED APPLICATIONS AUTHORIZATION

This application claims the benefit of priority under 35 U.S.C. § 119(e) to U.S. Provisional Patent Application No. 62/402,623, filed Sep. 30, 2016, and entitled "TRANSIT VEHICLE INFORMATION MANAGEMENT SYSTEMS AND METHODS," the content of which is herein incorporated by reference in its entirety.

COPYRIGHT AUTHORIZATION

Portions of the disclosure of this patent document may contain material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

SUMMARY

The present disclosure relates generally to systems and methods for managing data obtained by a variety of sensors associated with a vehicle. More specifically, but not exclusively, the present disclosure relates to systems and methods for managing data obtained by sensors associated with one or more transit service vehicles.

A vehicle may include a variety of sensors configured to collect a variety of types of information relating to the vehicle, its surrounding environment, and/or its passenger or occupants. For example, a vehicle may include a weight sensor configured to measure passenger and/or load weight, a Global Positioning System ("GPS") sensor to measure geographic location, one or more cameras, and/or the like. Information obtained by such sensors may be used in a variety of vehicle control and/or management contexts. For example, weight information obtained by a weight sensor associated with a train car may be used to determine whether the train car can be pulled by an engine, and location information obtained by a GPS sensor may be used to locate an associated vehicle and/or determine an estimated arrival time of the vehicle at a particular location.

Systems and methods disclosed herein may use information obtained from sensors associated with a vehicle to, among other things, manage vehicle occupancy. Certain embodiments of the disclosed systems and methods may be utilized in connection with one or more train cars associated with a transit service. In some embodiments, one or more train cars may include weight sensors that provide an indication of a passenger load of an associated car. For example, weight sensors may provide an estimate and/or measure of a number of passengers on a particular car, a relative occupancy of the car, and/or the like.

Information obtained from these sensors may be communicated to a system associated with a transit service, which may use the information to estimate occupancy of the one or more train cars and provide an indication of such occupancy to prospective passengers. For example, in some embodiments, an indication of the occupancy of an approaching train car may be provided to prospective passengers via one or more displays at a transit station and/or via mobile devices associated with the passengers. In various additional embodiments, information obtained from sensors associated with a vehicle may further be used in connection with targeting and/or otherwise managing advertising and/or other content displayed to passengers of the vehicle.

BRIEF DESCRIPTION OF THE DRAWINGS

The inventive body of work will be readily understood by referring to the following detailed description in conjunction with the accompanying drawings, in which.

DETAILED DESCRIPTION

A detailed description of the systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

The embodiments of the disclosure may be understood by reference to the drawings, wherein like parts may be designated by like numerals. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of any method disclosed herein do not necessarily need to be executed in any specific order, or even sequentially, nor need the steps be executed only once, unless otherwise specified.

Various embodiments of the systems and methods disclosed herein relate to the management and use of information relating to vehicles. In certain embodiments, such information may comprise information that may be used to estimate an occupancy of one or more vehicles, which may include vehicles associated with a transit service. For example, weight information obtained by a weight sensor associated with a vehicle may be used to estimate a relative passenger occupancy of a vehicle and/or a number of occupants in the vehicle.

Embodiments disclosed herein may use such information to, among other things, manage vehicle occupancy and/or select and deliver content to vehicle occupants. In certain embodiments, an indication of the occupancy of a vehicle may be provided to prospective passengers via one or more visual displays associated with a transit station and/or mobile and/or personal electronic devices associated with the prospective passengers. In further embodiments, vehicle occupancy information may further be used in connection with managing advertisements displayed to occupants of a vehicle.

Figure 1:
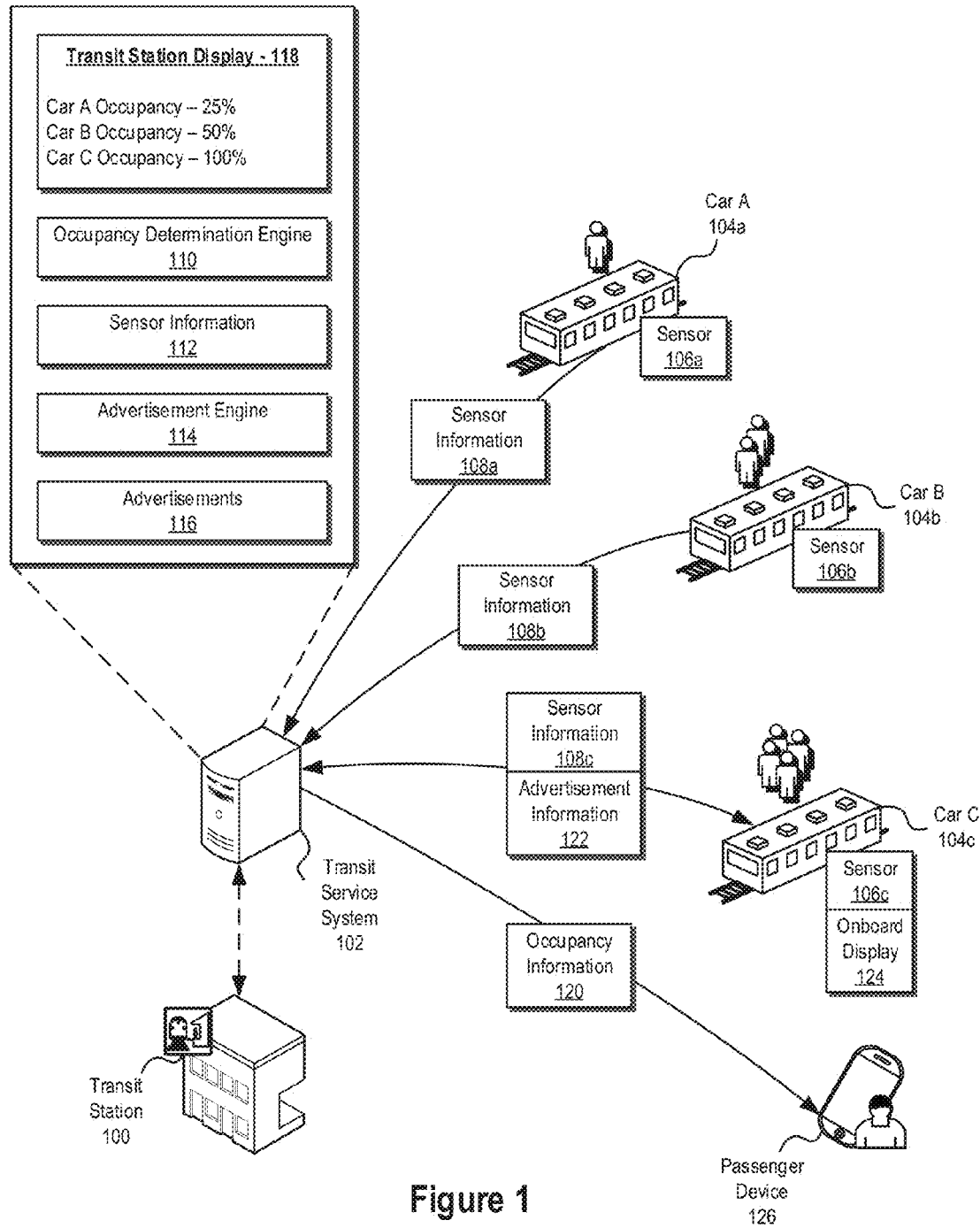
FIG. 1 illustrates an example of an architecture of a transit vehicle information management system consistent with embodiments of the present disclosure.

FIG. 1 illustrates an exemplary architecture of a vehicle information management system, which in some embodiments may comprise a transit service system 102, consistent with embodiments of the present disclosure. In certain embodiments, a transit service may be associated one or more vehicles 104a-104c (i.e., "Car A," "Car B," and "Car C"). Consistent with embodiments disclosed herein, the vehicles 104a-104c may comprise any mobile platform, apparatus, and/or device that may include and/or otherwise be associated with one or more sensors 106a-106c for collecting information relating to the platform, apparatus, and/or device. As illustrated, the vehicles 104a-104c may comprise one or more train cars, although it will be appreciated that any suitable type of vehicle may be used in connection with the disclosed embodiments. For example, the vehicles 104a-104c may comprise light rail cars, monorail cars, buses, cars, trucks, boats, ferries, taxis, passenger vehicles, freight vehicles, and/or any other type of vehicle that may include and/or otherwise be associated with one or more sensors 106a-106c.

Although vehicles 104a-104c are illustrated as being the same type of vehicle (e.g., train cars), it will be appreciated that, in other contexts, the various disclosed embodiments may be used in connection with vehicles of different types. In addition, although certain embodiments are described in connection with one or more vehicles 104a-104c associated with a transit service, it will be appreciated that various disclosed embodiments may further used in a variety of other transportation contexts, including in connection with vehicles associated with other types of transportation services (e.g., ridesharing services and/or the like) and/or vehicles that are not necessarily associated with a particular service. Moreover, certain embodiments of the disclosed systems and methods may be implemented in connection with one or more other platforms that are not vehicles and/or transportation platforms.

The vehicles 104a-104c may comprise and/or otherwise be associated with one or more sensors 106a-106c configured to measure a variety of information that may be used to determine and/or otherwise estimate an occupancy of an associated vehicle 104a-104c. For example, consistent with embodiments disclosed herein, information provided by the sensors 106a-106c may be used by the transit service system 102 to, among other things, estimate an individual occupancy of a vehicle 104a-104c (e.g., "full," "half full," "full," etc.), estimate a number of occupants in a vehicle 104a-104c, and/or estimate an occupancy of a vehicle 104a-104c relative to one or more other vehicles 104a-104c.

In certain embodiments, the sensors 106a-106c may comprise sensors confirmed to provide information indicative of a load weight of an associated vehicle 104a-104c. Consistent with embodiment disclosed herein, vehicle load weight information may provide an indication of a passenger weight of an associated vehicle 104a-104c, which may provide a measure of an occupancy of the vehicle 104a-104c. In further embodiments, the one or more sensors 106a-106c may comprise one or more location determination sensors, such as a GPS sensor, although other location determination sensors are also contemplated. It will be appreciated that certain embodiments of the disclosed systems and methods may be used in connection with a variety of other types of sensors 106a-106c.

A transit service system 102 associated with a transit service and/or a particular transit station 100 may be in communication with the vehicles 104a-104c and/or associated sensors 106a-106c. For example, in some embodiments, the transit service system 102 may receive sensor information 108a-108c generated by the sensors 106a-106c associated with the one or more vehicles 104a-104c. As discussed below, the transit service system 102 may further transmit information to the vehicles 104a-104c and/or systems associated therewith.

Additionally, the transit service system 102 may be in communication with a device 126 and/or system associated with a passenger. The passenger device 126 may comprise a variety of computing devices and/or systems including, without limitation, a laptop computer system, a desktop computer system, a smartphone, a table computer, a mobile electronic device, and/or the like.

The transit service system 102 may be configured to aggregate, manage, and/or otherwise operate on sensor information collected by the one or more vehicles 104a-104c and/or associated sensors 106a-106c. In certain embodiments, the transit service system 102 may be further configured to interact with a display 118 associated with the transit service system 102 in connection with displaying certain information (e.g., occupancy information and/or the like). For example, the transit service system 102 may be configured to provide a variety of information to passengers at a transit station 100 via an associated transit station display 118.

The transit service system 102, transit station display 118, passenger device 126, vehicles 104a-104c and/or associated sensors 106a-106c may be communicatively coupled via one or more networks comprising one or more connections. The network connections may comprise a variety of network communication devices and/or channels and may utilize any suitable communications protocols and/or standards facilitating communication between the connected devices and systems 102, 118, 126, 104a-104c, 106a-106c. The network connections may comprise the Internet, a local area network, a virtual private network, and/or any other communication network utilizing one or more electronic communication technologies and/or standards (e.g., Ethernet or the like). In some embodiments, the network connections may comprise a wireless carrier system such as a personal communications system ("PCS"), and/or any other suitable communication system incorporating any suitable communication standards and/or protocols.

In further embodiments, the network connections may comprise an analog mobile communications network and/or a digital mobile communications network utilizing, for example, code division multiple access ("CDMA"), Global System for Mobile Communications or Groupe Special Mobile ("GSM"), frequency division multiple access ("FDMA"), and/or time divisional multiple access ("TDMA") standards. In certain embodiments, the network connections may incorporate one or more satellite communication links. In yet further embodiments, the network connections may utilize IEEE's 802.11 standards, Bluetooth®, ultra-wide band ("UWB"), Zigbee®, and/or any other suitable standard or standards.

The transit service system 102, transit station display 118, passenger device 126, vehicles 104a-104c, and/or associated sensors 106a-106c may comprise any suitable computing system or systems configured to implement embodiments of the systems and methods disclosed herein. In certain embodiments, the transit service system 102, transit station display 118, passenger device 126, vehicles 104a-104c, and/or associated sensors 106a-106c may comprise at least one processor system configured to execute instructions stored on an associated non-transitory computer-readable storage medium.

As discussed in more detail below, the transit service system 102, transit station display 118, passenger device 126, vehicles 104a-104c, and/or associated sensors 106a-106c may further comprise a secure processing unit ("SPU") configured to perform sensitive operations such as trusted credential and/or key management, secure policy management, and/or other aspects of the systems and methods disclosed herein. The transit service system 102, transit station display 118, passenger device 126, vehicles 104a-104c, and/or associated sensors 106a-106c may further comprise software and/or hardware configured to enable electronic communication of information between the transit service system 102, transit station display 118, passenger device 126, vehicles 104a-104c, and/or associated sensors 106a-106c via one or more associated network connections.

Sensor information 108a-108c measured and/or otherwise collected by sensors 106a-106c associated with the vehicles 104a-104b may be communicated to the transit service system 102. In certain embodiments, the sensor information 108a-108c may be communicated directly to the transit service system 102 from the sensors 106a-106c and/or the vehicles 104a-104c. In other embodiments, the sensor information 108a-108c may be communicated via one or more intermediate systems.

The transit service system 102 may be configured to aggregate, manage, and/or otherwise operate on the received sensor information 108a-108c which may be aggregated and/or otherwise managed in a sensor information database 112. As discussed above, in certain embodiments, the received sensor information 108a-108c may comprise information related to a load weight of an associated vehicle 104a-104c. In some embodiments, the load weight may provide an indication and/or otherwise be used to estimate a number of passengers and/or an occupancy of the vehicle 104a-104c. For example, if a vehicle 104a-104c is relatively full, the load weight may be higher than if the vehicle 104a-104c is relatively empty.

In certain embodiments, an occupancy determination engine 110 executing on the transit service system 102 may determine an estimated occupancy for the one or more vehicles 104a-104c based on associated received sensor information 106a-106c. The occupancy determination engine 110 may provide an estimate of the occupancy of a vehicle 104a-104c and/or a number of occupants in a vehicle 104a-104c based on its individual associated received sensor information 106a-106c. For example, based on sensor information 106a, the occupancy determination engine 110 may estimate an occupancy of vehicle 104a and/or the number of occupants in the vehicle 104a by comparing the load weight indicated by sensor information 106a with a known unoccupied vehicle load weight and/or one or more load weight thresholds associated with estimated vehicle capacities and/or occupancy numbers (e.g., "full," "partially full," "empty," "capacity," "partial capacity," "available," "25+ passengers," etc.). It will be appreciated that estimated vehicle capacity and/or occupant numbers associated with a vehicle 104a-104c may be indicated in a variety of ways, and that any suitable manner of indicating a capacity and/or number of vehicle occupants may be used in connection with the disclosed embodiments.

In certain embodiments, the occupancy determination engine 110 may compare an estimated occupancy of a vehicle 104a-104c based on associated sensor information 108a-108c relative to one or more other vehicles 104a-104c. For example, by comparing sensor information 108a associated with vehicle 104a and sensor information 108c associated with vehicle 104c, the occupancy determination engine 110 may determine that vehicle 104a weighs more than vehicle 104c. Accordingly, the occupancy determination engine 110 may estimate a greater passenger occupancy with vehicle 104a than with vehicle 104c.

Vehicle occupancy information determined based on received sensor information 108a-108c may be used to more efficiently balance passengers between various transit service vehicles 104a-104c. For example, when arriving at a transit station 100, certain train cars may be relatively full while other train cars may be relatively empty. Prior to arrival of the train at the transit station 100, however, prospective passengers may not have knowledge of the relative occupancy of the various train cars. Accordingly, the prospective passengers may wait for arrival of the train the end of the station platform where the arriving train cars will be at capacity, whereas if they were to wait at the other end of the station platform, the arriving cars may have more available passenger space. Passenger and/or transit service knowledge of the relative occupancy rates of transit service vehicles 104a-104c may be used to more effectively balance passenger loading between various vehicles 104a-104c (e.g., train cars). This may, among other things, limit the need for passengers to move between various train cars at a transit station prior to loading, resulting in a more efficient loading process and/or a more comfortable journey.

In one example, the transit service system 102 may determine that a train is approaching based on received location information from associated vehicles 104a-104c (i.e., train cars). For example, the transit service system 102 may receive information from a GPS and/or other location-based system associated with the train and/or its constituent cars. Based on received sensor information 108a-108c, the occupancy determination engine 110 executing on the transit service system 102 may determine occupancy rates for the various train cars and provide an indication to passengers waiting to board the train at the train station 100 of the relative occupancy rates. For example, the transit service system 102 may display on a transit station display 118 message board an indication of approaching train car occupancy rates (e.g., "Car A Occupancy—25%, Car B Occupancy—50%, Car C Occupancy—100%").

In another example, certain lights at the transit station 100 may be illuminated to indicate relative occupancy rates of arriving train cars. For example, green lights may be illuminated at portions of the transit station 100 proximate to arriving cars with relatively low occupancy and red lights may be illuminated at portions of the transit station 100 proximate to arriving cars with relatively high occupancy. In this manner, prospective passengers may be guided to portions of the platform where arriving train cars will have more room.

In further embodiments, an indication 120 of the occupancy of arriving transit vehicles 104a-104c may be communicated to a device 126 associated with a prospective passenger. For example, the transit service system 102 may communicate occupancy information 102 to a passenger device 126 for display to a prospective passenger via a short message service ("SMS") message, an application pop-up and/or notification, a website pop-up and/or notification, and/or the like. It will be appreciated that relative occupancy rates may be communicated to passengers in a variety of ways, and that any suitable method to alert passengers of the relative occupancy rates of an approaching transit vehicle may be used in connection with the disclosed embodiments.

In some embodiments, occupancy information estimated by the occupancy determination engine 110 may be utilized to manage content displayed to transit vehicle passengers. In certain embodiments, an advertisement and/or content engine 114 executing on the transit service system 102 and/or another system may select and/or distribute content and/or advertisements 116 to a vehicle 104c based on occupancy information associated with the vehicle 104c (e.g., communicated to vehicle 104c as advertisement information 112).

For example, the transit service system 102 may communicate selected advertisement information 122 to transit vehicle 104c for display on an associated onboard display 124 based on the determined occupancy rate of the vehicle 104c. In certain embodiments, compensation paid to the transit service for display of an advertisement may be determined based on a relative occupancy rate in the vehicles 104a-104c where the advertisement is displayed. For example, in some embodiments, displaying an advertisement on a vehicle 104a-104c that has a relatively high occupancy rate may result in more compensation being paid to the transit service from an advertiser than that paid for displaying an advertisement on a vehicle 104a-104c that has a relatively low occupancy rate. In this manner, advertisements may be managed for transmission and display by the transit service system 102 to improve associated advertisement revenue.

Additional sensor and/or other information may be used in connection with managing content displayed to passengers via onboard displays 124. For example, in some embodiments, additional demographic and/or other passenger profile information may be used in addition to determined occupancy rates to manage content transmitted to vehicles 104a-104c and displayed via onboard displays 124. Such information may be obtained in a variety of ways including, for example, by receiving demographic information associated with passengers from associated devices 126, user information services and/or other third parties, via camera and/or other imaging and/or sensor systems included in a vehicle 104a-104c and/or the like. In certain embodiments, information may be received by transit service system 102 that is used to determine and/or otherwise derive demographic segmentation of a vehicle's passengers and/or passenger profile information. In further embodiments, passenger devices 126 may communicate various device and/or passenger profile information to a communication and/or other sensor system associated with a vehicle 104a-104c that may be used in connection with managing content displayed via onboard displays. 124

In some embodiments, occupancy information estimated by the occupancy determination engine 110 of the transit service system 102 may be communicated to one or more third-party systems that may use the information in a variety of contexts. For example, a ridesharing, taxi, and/or other transportation service may wish to increase their rates when the transit service is at capacity and demand for alternative transportation is at relatively high levels. Conversely, ridesharing, taxi, and/or other transportation services may wish to decrease their rates when the transit service is relatively underutilized and demand for transportation is at a relatively low level. In this manner, other entities may price their services based in part on the occupancy information estimated by the transit service system 102.

In further embodiments, prospective passengers may be incentivized by a transit service for boarding transit vehicles 104a-104c with greater occupancy and contributing to a more efficient loading process. For example, the transit service system 102 may determine based on location information associated with a passenger device 126 and/or via any other suitable method that an associated passenger boarded a transit vehicle 104a with relatively ample available passenger space, and may incentivize the passenger for their action (e.g., by issuing a fee discount, a coupon, and/or the like). Similarly, the transit service system 102 may determine based on location information associated with a passenger device 126 and/or via any other suitable method that an associated passenger boarded a transit vehicle 104a with relatively little available passenger space, and may disincentivize the passenger for their action (e.g., by increasing their fare and/or the like). In some embodiments, the transit service system 102 may employ such an incentive/disincentive methodology during certain service hours where improving the passenger loading process is more beneficial (e.g., during commute hours and/or the like)

It will be appreciated that a number of variations can be made to the architecture, relationships, and examples presented in connection with FIG. 1 within the scope of the inventive body of work. In some embodiment, certain system functionalities described above may be integrated into a single system and/or any suitable combination of systems in any suitable configuration. For example, certain functions performed by the transit service system 102 may be performed by passenger devices 126 and/or one or more third-party services (e.g., advertisement services, ridesharing services etc.). Thus, it will be appreciated that the architecture, relationships, and examples presented in connection with FIG. 1 are provided for purposes of illustration and explanation, and not limitation.

Figure 2:
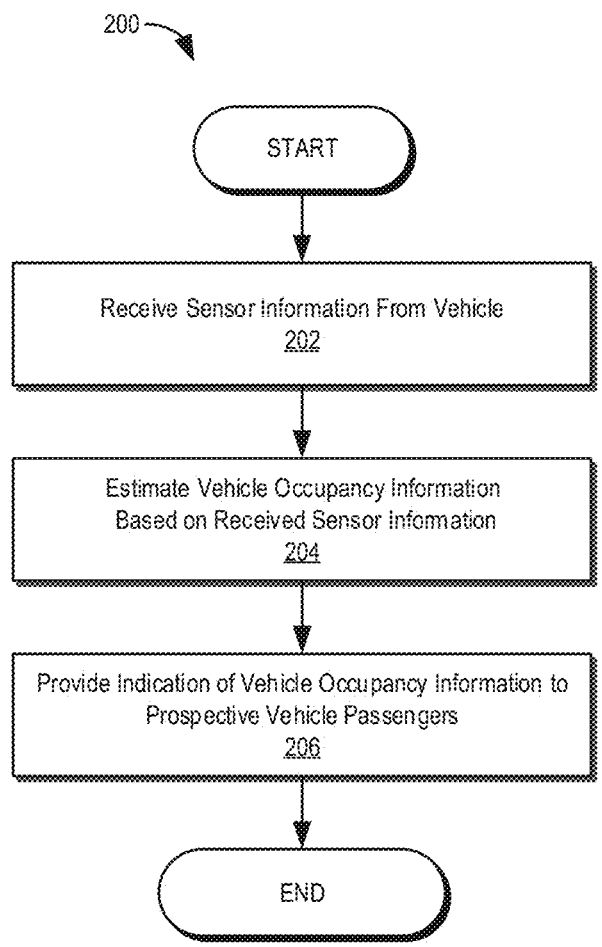
FIG. 2 illustrates a flow chart of an exemplary method of managing information received from a sensor associated with a transit service vehicle consistent with embodiments of the present disclosure.

FIG. 2 illustrates a flow chart of an exemplary method 200 of managing information received from a sensor associated with a transit vehicle consistent with embodiments of the present disclosure. The illustrated method 200 may be implemented in a variety of ways, including using software, firmware, hardware, and/or any combination thereof. In certain embodiments, various aspects of the method 200 and/or its constituent steps may be performed by a transit service system, one or more vehicles and/or associated sensors, and/or any other suitable system or combination of systems. In certain embodiments, the illustrated method 200 may facilitate management of vehicle occupancy based on sensor information received from one or more vehicles.

Sensor information generated by one or more sensors associated with one or more vehicles may be received by a transit service system at 202. In certain embodiments, the sensor information may comprise information from one or more weight sensors that may provide an indication of a passenger load weight of an associated vehicle. In further embodiments, a variety of other sensors may generate sensor information used in connection with the illustrated method 200. For example, in some embodiments, cameras and/or other imaging sensors (e.g., infrared camera systems) generating information that may be used to estimate vehicle occupancy may be used in connection with the illustrated method 200. Similarly, other passenger count information sensors (e.g., information from infrared sensors, turnstiles sensors, and/or the like) that may provide information that may be used to estimate a relative occupancy of a vehicle may be used. In some embodiments, a variety of types of sensor information may be used in connection with the disclosed method 200.

Based on the received sensor information, the occupancy of the one or more vehicles may be estimated at 204 consistent with various embodiments disclosed herein. In certain embodiments, different types of available sensor information may be weighted differently than other types of sensor information in connection with estimating vehicle occupancy at 204. For example, if passenger count sensor information is available, it may be prioritized and/or more heavily weighted than vehicle weight sensor information and/or camera information in connection with estimating vehicle occupancy. In further embodiments, increased confidence information may be associated with vehicle occupancy estimations when available sensor information is in agreement than what may be associated with vehicle occupancy estimations when sensor information results in inconsistent estimation of occupancy.

At 206, an indication of the estimated occupancy may be provided to prospective passengers. For example, in some embodiments, an indication that a train car is approaching and the estimated occupancy of the train car may be provided to prospective passengers via one or more displays at a transit station, via one or more platform indicator lights, via messages and/or notifications sent to mobile devices associated with the passengers, and/or the like. In further embodiments, the indication of the estimated occupancy may be provided to one or more other third-party systems and/or services.

Figure 3:
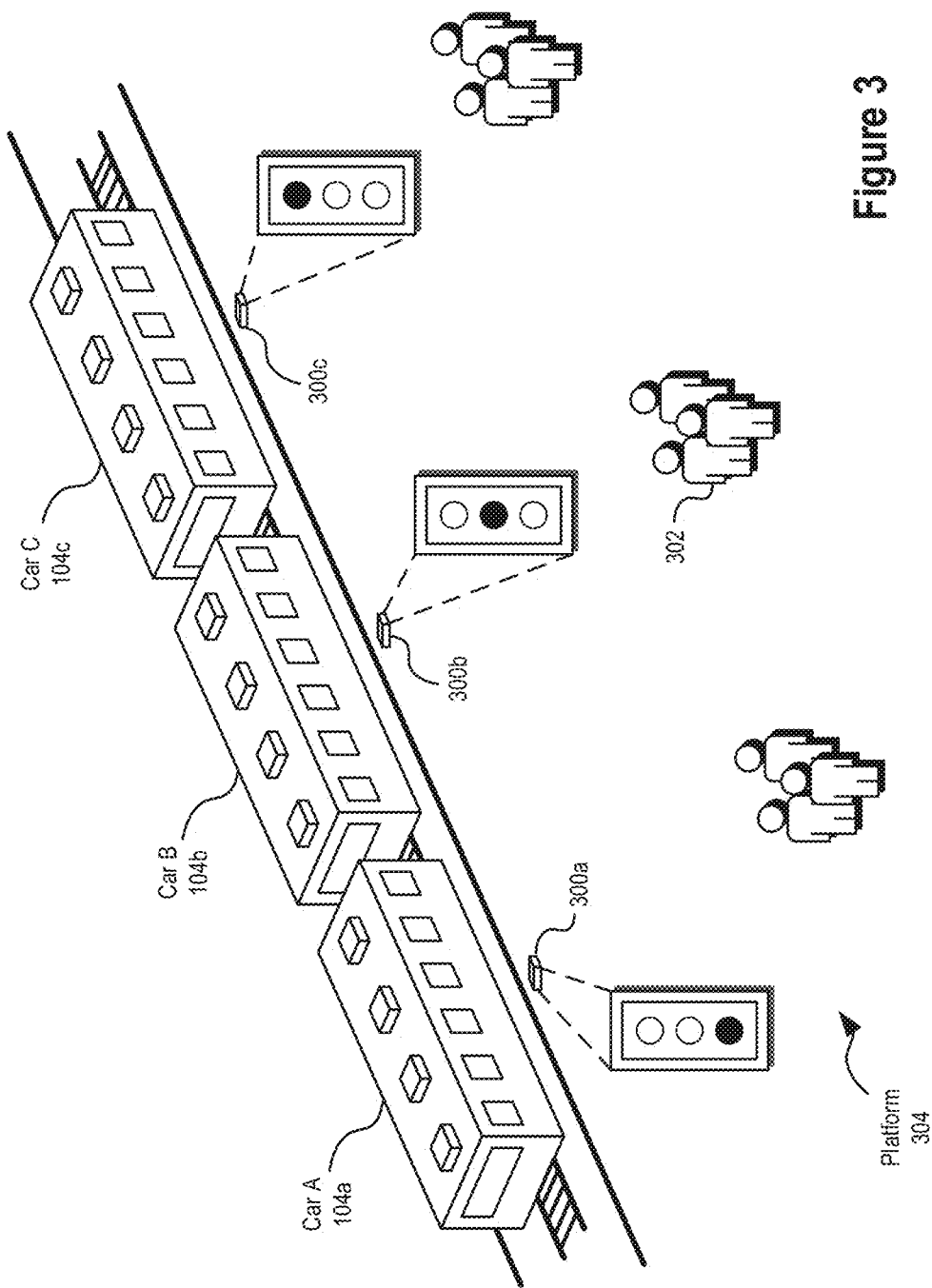
FIG. 3 illustrates an example of occupancy indicators associated with a transit station consistent with embodiments of the present disclosure.

FIG. 3 illustrates an example of occupancy indicators 300a-300c associated with a transit station consistent with embodiments of the present disclosure. Consistent with embodiments disclosed herein, a transit service system and/or other associated system may be configured to control occupancy indicators 300a-300c associated with a transit station platform 304 to illuminate at portions of the platform 304 to indicate relative occupancy rates of arriving train cars. For example, a first indicator light 300a may be illuminated at a first color (e.g., green) to indicate that the vehicle 104a that will be or is proximate to a portion of the platform 304 associated with the first indicator light 300a is relatively empty, a second indicator light 300b may be illuminated at a second color (e.g., yellow) to indicate that the vehicle 104b that will be or is proximate to a portion of the platform 304 associated with the second indicator light 300b is moderately full, and a third indicator light 300c may be illuminated at a third color (e.g., red) to indicate that the vehicle 104c that will be or is proximate to a portion of the platform 304 associated with the third indicator light 300c is completely full.

In the manner detailed above, prospective passengers 302 may be visually guided to portions of the platform 304 where arriving transit vehicles 104a-104c cars will have more available space. It will be appreciated that a variety of types of lights, visual, audible, and/or any other type of indicator may be used in connection with guiding passengers 302 to vehicles 104a-104c based on relative occupancy consistent with embodiments disclosed herein, and that any suitable method of communicating and/or otherwise indicating such information to prospective passengers 302 may be used in connection with the disclosed embodiments.

Figure 4:
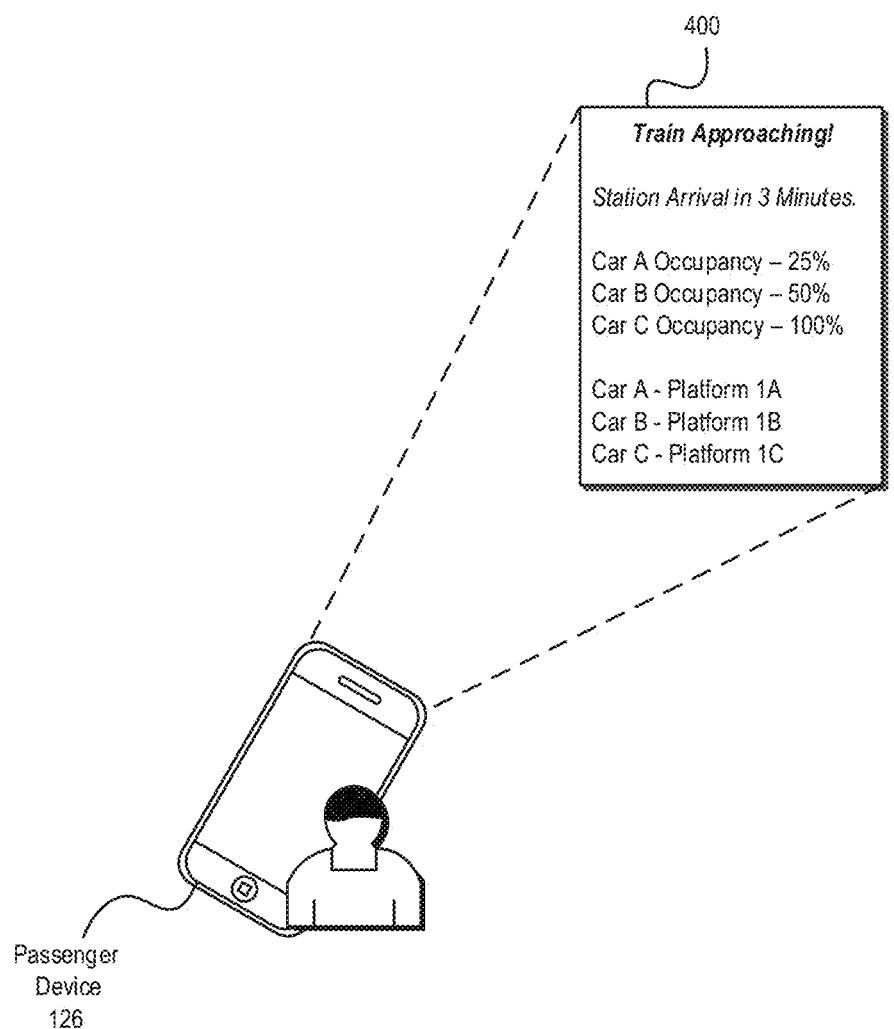
FIG. 4 illustrates an example of an interface of a mobile device providing an indication of an estimated occupancy of a vehicle consistent with embodiments of the present disclosure.

FIG. 4 illustrates an example of an interface 400 of a mobile device 126 associated with a passenger providing an indication of an estimated occupancy of a vehicle consistent with embodiments of the present disclosure. As discussed above, one or more indications of the estimated occupancy of arriving vehicles 104a-104c may be communicated to a device 126 associated with prospective passengers from a transit service system. Indications of the estimated occupancy of arriving transit vehicles may be communicated to a device 126 associated with a prospective passenger in a variety of ways. For example, a transit service system may send a SMS message to a passenger device 126 that comprises an indication of the estimated occupancy of arriving transit vehicle.

In further embodiments, a transit service system may send an application update, pop-up, and/or notification to a passenger device 126 updating an interface 400 of an application associated with the transit service. For example, based on estimated transit vehicle occupancy and geo-location information, the interface of the passenger device 126 may communicate to a passenger a notification that one or more transit vehicles are approaching, an estimated time of arrival of the one or more transit vehicles at a station, the anticipated arrival location of the vehicles at the station (e.g., platform locations and/or the like), and/or an indication of the estimated occupancy of the arriving vehicles. Using such information, prospective passengers may be visually guided to portions of the platform where arriving transit vehicles will have more available space, resulting in a more efficient loading process and/or a more comfortable journey.

Figure 5:
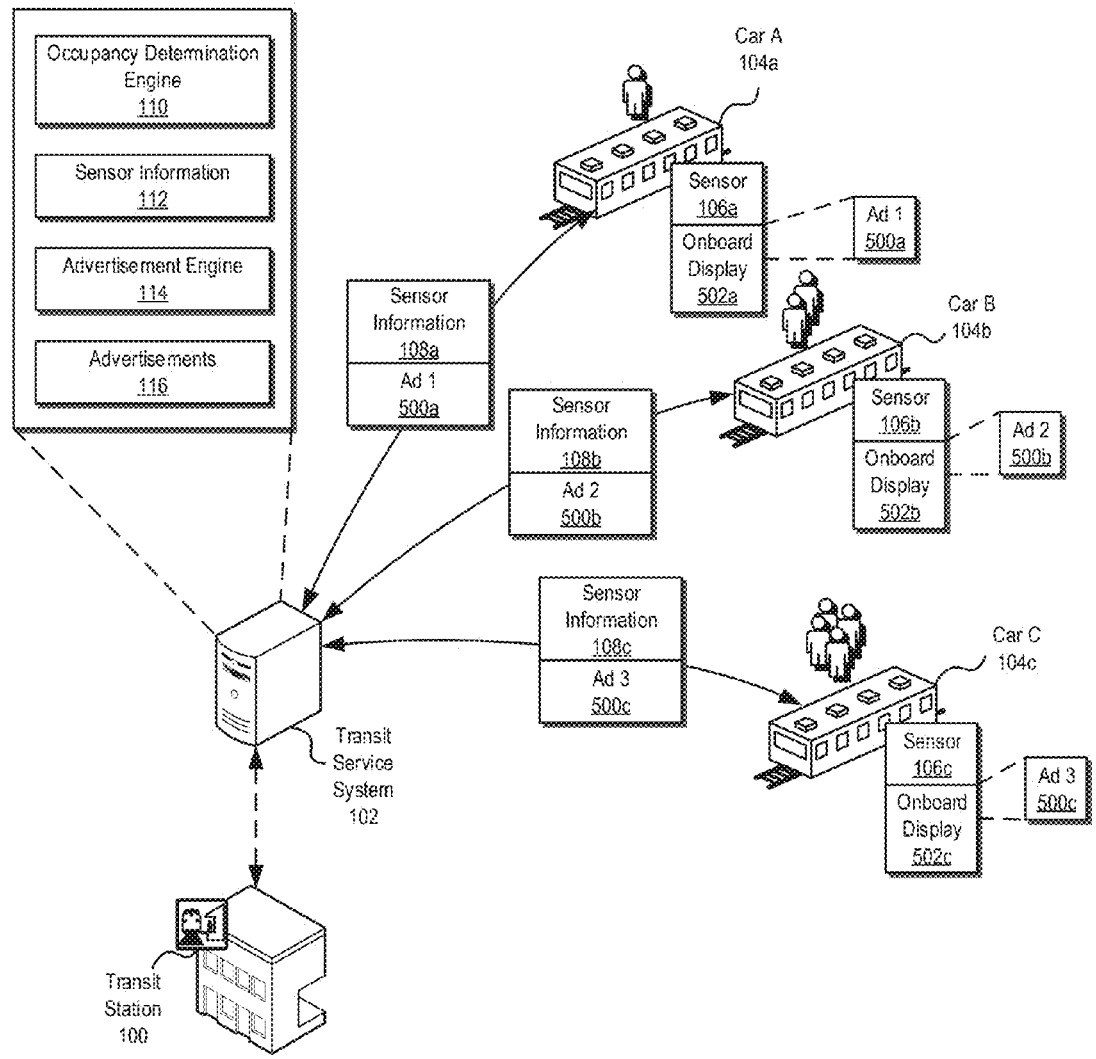
FIG. 5 illustrates distribution of content based on estimated vehicle occupancy consistent with embodiments of the present disclosure.

FIG. 5 illustrates distribution of content (e.g., advertisements 500a-500c) based on estimated vehicle occupancy consistent with embodiments of the present disclosure. Consistent with various embodiments disclosed herein, occupancy information estimated by an occupancy determination engine 110 executing on a transit service system 102 using sensor information 108a-108c associated with vehicles 104a-104c may be utilized to manage content (e.g., advertisements 116) displayed to transit vehicle passengers.

In certain embodiments, functions relating to the management of content based on estimated occupancy information may be performed by an advertisement and/or content engine 114 executing on the transit service system 102 and/or another system (e.g., an advertisement service system and/or the like). The advertisement and/or content engine 114 may select and/or distribute content and/or advertisements 116 to vehicles 104a-104c and/or associated passenger devices based on occupancy information associated with the vehicles 104a-104c.

In some embodiments, different advertisements 500a-500c and/or content may be distributed to different vehicles 104a-104c based on associated estimated occupancy and/or one or more content and/or advertisement selection algorithms used by the advertisement engine 114. For example, an advertising service may wish to have certain ads sent to a vehicle having relatively high occupancy, certain ads sent to a vehicle having average occupancy, and certain ads sent to a vehicle having low occupancy. Accordingly, as illustrated, the advertisement engine 114 may select a first ad 500c for distribution and/or display on an associated onboard display 502c of vehicle 104c having relatively high occupancy, a second ad 500b for distribution and/or display on an associated onboard display 502b of vehicle 104b having average occupancy, and a third ad 500a for distribution and/or display on an associated onboard display 502a of vehicle 104a having relatively low occupancy.

In various embodiments, compensation paid to the transit service for display of an advertisement may be determined based on a relative occupancy rate in the vehicle 104a-104c where the advertisement is displayed. For example, in some embodiments, displaying an advertisement on a vehicle that has a relatively high occupancy rate may result in more compensation being paid to the transit service from an advertiser than that paid for displaying an advertisement on a vehicle that has a relatively low occupancy rate. In this manner, the content and/or advertisement engine 114 may prioritize the distribution and/or display of advertisements to maximize and/or otherwise increase associated advertisement revenue. While various illustrated embodiments show distribution of advertisements 500a-500c for display on onboard displays 502a-502c associated with vehicles 104a-104c, in further embodiments advertisements may be sent to a vehicle 104a-104c for distribution to one or more devices associated with passengers riding on the vehicles 104a-104c and/or directly to passenger devices by the transit service system 102 and/or an associated advertisement service.

Figure 6:
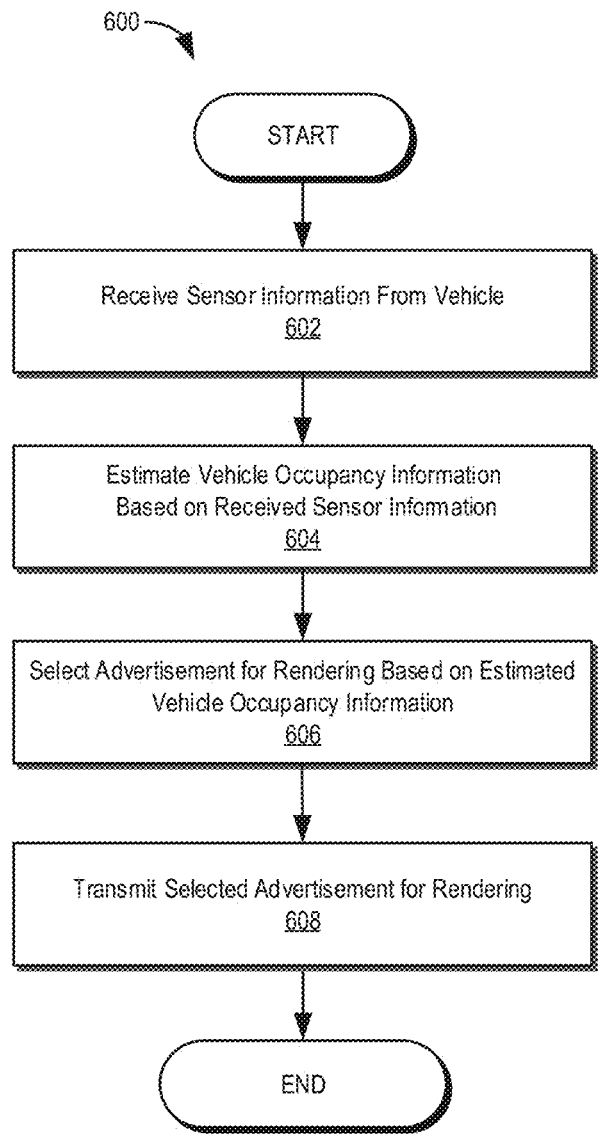
FIG. 6 illustrates a flow chart of an exemplary method of distributing content based on estimated vehicle occupancy consistent with embodiments of the present disclosure.

FIG. 6 illustrates a flow chart of an exemplary method 600 of distributing content based on estimated vehicle occupancy consistent with embodiments of the present disclosure. The illustrated method 600 may be implemented in a variety of ways, including using software, firmware, hardware, and/or any combination thereof. In certain embodiments, various aspects of the method 600 and/or its constituent steps may be performed by a transit service system, one or more vehicles and/or associated sensors, and/or any other suitable system or combination of systems. In certain embodiments, the illustrated method 600 may facilitate management and distribution of content to vehicles and/or associated passengers based on estimated vehicle occupancy.

Sensor information generated by one or more sensors associated with one or more vehicles may be received by a transit service system at 602. In certain embodiments, the sensor information may comprise information from one or more weight sensors that may provide an indication of a passenger load weight of an associated vehicle, although other types of sensors and/or sensor information may also be used in connection with the illustrated method 600, including any of the types of sensors and/or sensor information disclosed herein. Based on the received sensor information, the occupancy of the one or more vehicles may be estimated at 204 consistent with various disclosed embodiments.

Advertisements and/or content may be selected and/or distributed to vehicles and/or associated passenger devices for rendering based on occupancy information associated with the vehicles at 606. In some embodiments, different advertisements and/or content may be selected and distributed to different vehicles based on associated estimated occupancy and/or one or more content and/or advertisement selection algorithms. In further embodiments, the selection, distribution, and/or display of advertisements may operate to maximize and/or otherwise increase associated advertisement revenue.

At 608, content and/or advertisements selected at 606 may be distributed to one or more rendering systems and/or devices. For example, in some embodiments, advertisements may be distributed to one or more onboard displays of associated vehicles. In further embodiments, advertisements may be distributed, either directly and/or indirectly, to one or more devices associated with passengers riding of the vehicles.

Figure 7:
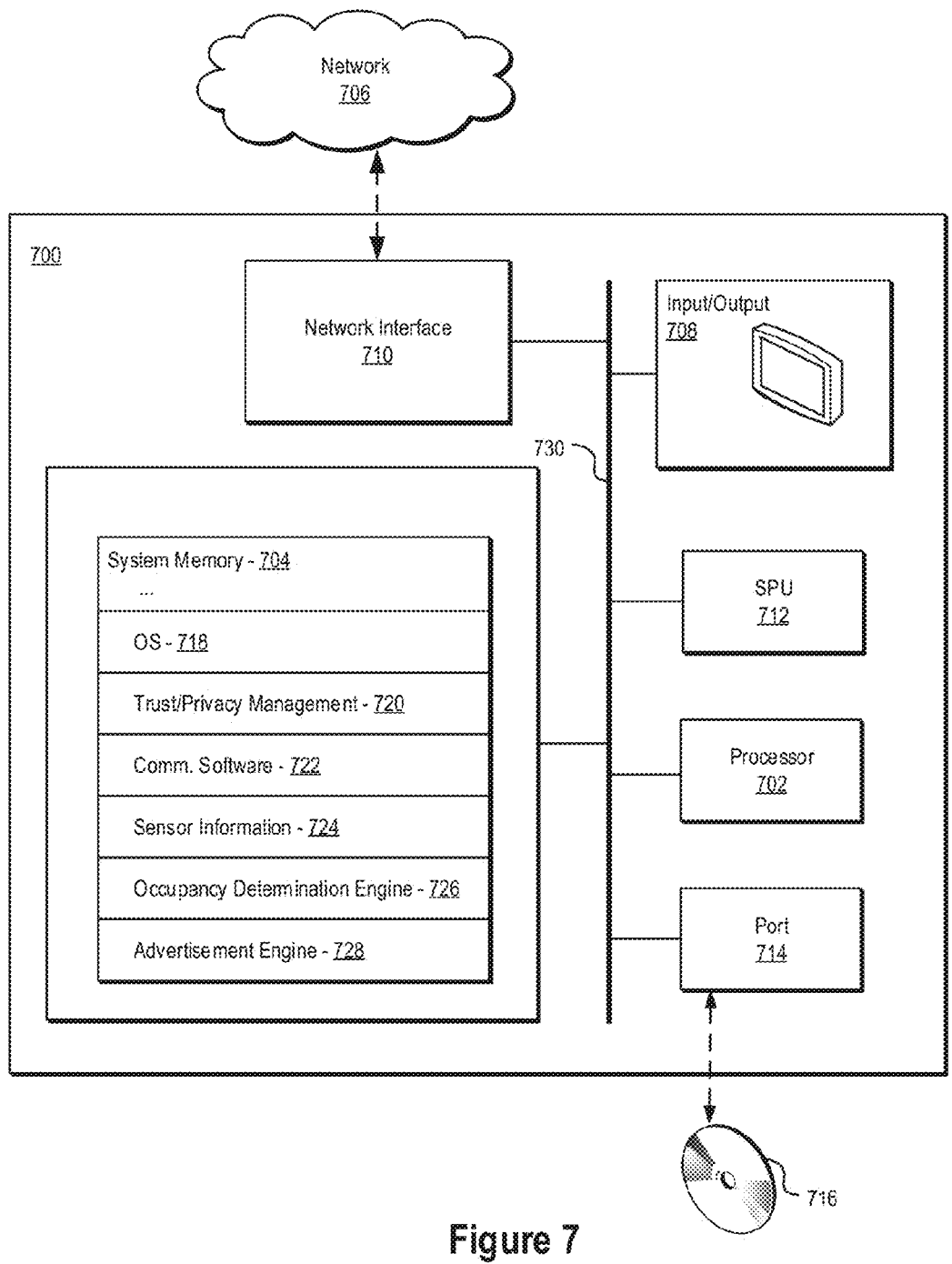
FIG. 7 illustrates an exemplary system that may be used to implement certain embodiments of the systems and methods disclosed herein.

FIG. 7 illustrates an exemplary system 700 that may be used to implement embodiments of the systems and methods of the present disclosure. Certain elements associated with the illustrated exemplary system 700 may be included in one or more systems configured to store, communicate, and/or otherwise use vehicle sensor information 724, and/or any other system configured to implement embodiments of the disclosed systems and methods. For example, certain elements of the illustrated system 700 may be included in and/or otherwise associated with a transit system, one or more vehicles, one or more devices associated with a passenger, and/or the like.

As illustrated in FIG. 7, the system 700 may include: a processing unit 702; system memory 704, which may include high speed random access memory ("RAM"), non-volatile memory ("ROM"), and/or one or more bulk non-volatile non-transitory computer-readable storage mediums (e.g., a hard disk, flash memory, etc.) for storing programs and other data for use and execution by the processing unit 702; a port 714 for interfacing with removable memory 716 that may include one or more diskettes, optical storage mediums, and/or other non-transitory computer-readable storage mediums (e.g., flash memory, thumb drives, USB dongles, compact discs, DVDs, etc.); a network interface 710 for communicating with other systems via one or more network connections of a network 706 using one or more communication technologies; a user interface 708 that may include a display and/or one or more input/output devices such as, for example, a touchscreen, a keyboard, a mouse, a track pad, and the like; and one or more busses 730 for communicatively coupling the elements of the system 700.

In some embodiments, the system 700 may, alternatively or in addition, include an SPU 712 that is protected from tampering by a user of the system or other entities by utilizing secure physical and/or virtual security techniques. An SPU 712 can help enhance the security of sensitive operations such as personal information management, trusted credential and/or key management, privacy and policy management, versioning control and/or management, and other aspects of the systems and methods disclosed herein. In certain embodiments, the SPU 712 may operate in a logically secure processing domain and be configured to protect and operate on secret information, as described herein. In some embodiments, the SPU 712 may include internal memory storing executable instructions or programs configured to enable the SPU 712 to perform secure operations, as described herein.

The operation of the system 700 may be generally controlled by a processing unit 702 and/or an SPU 712 operating by executing software instructions and programs stored in the system memory 704 (and/or other computer-readable media, such as removable memory 716). The system memory 704 may store a variety of executable programs or modules for controlling the operation of the system 700. For example, the system memory 704 may include an operating system ("OS") 718 that may manage and coordinate, at least in part, system hardware resources and provide for common services for execution of various applications and a trust and privacy management system 720 for implementing trust and privacy management functionality including protection and/or management of data through management and/or enforcement of associated policies. The system memory 704 may further include, without limitation, communication software 722 configured to enable in part communication with and by the system; one or more applications; sensor information 724, which may include any of the types of sensor information described herein; an occupancy determination engine 726 configured to estimate vehicle occupancy based on available sensor information; an advertisement engine 728 configured to engage in advertisement and/or other content delivery management operations; and/or any other information, modules, and/or applications configured to implement embodiments of the systems and methods disclosed herein.

The systems and methods disclosed herein are not inherently related to any particular computer, device, service, or other apparatus and may be implemented by a suitable combination of hardware, software, and/or firmware. Software implementations may include one or more computer programs comprising executable code/instructions that, when executed by a processor, may cause the processor to perform a method defined at least in part by the executable instructions. The computer program can be written in any form of programming language, including compiled or interpreted languages, and can be deployed in any form, including as a standalone program or as a module, component, subroutine, or other unit suitable for use in a computing environment. Further, a computer program can be deployed to be executed on one computer or on multiple computers at one site or distributed across multiple sites and interconnected by a communication network.

Software embodiments may be implemented as a computer program product that comprises a non-transitory storage medium configured to store computer programs and instructions, that when executed by a processor, are configured to cause the processor to perform a method according to the instructions. In certain embodiments, the non-transitory storage medium may take any form capable of storing processor-readable instructions on a non-transitory storage medium. A non-transitory storage medium may be embodied by a compact disk, digital-video disk, an optical storage medium, flash memory, integrated circuits, or any other non-transitory digital processing apparatus memory device.

Although the foregoing has been described in some detail for purposes of clarity, it will be apparent that certain changes and modifications may be made without departing from the principles thereof. It should be noted that there are many alternative ways of implementing both the systems and methods described herein. Accordingly, the present embodiments are to be considered as illustrative and not restrictive, and the invention is not to be limited to the details given herein, but may be modified within the scope and equivalents of the appending claims.

What is claimed is:

1. A method for balancing passenger load between vehicles of a transit service system, the method performed by the transit service system associated with a transit station comprising a processor and a non-transitory computer-readable medium storing instructions that, when executed by the processor, cause the transit service system to perform the method, the method comprising:
   receiving, from a first sensor associated with a first transit vehicle, first sensor information;
   receiving, from a second sensor associated with a second transit vehicle, second sensor information;
   determining, based on the first sensor information, an estimated occupancy of the first transit vehicle;
   determining, based on the second sensor information, an estimated occupancy of the second transit vehicle;
   generating a first indication relating to the estimated occupancy of the first transit vehicle;
   generating a second indication relating to the estimated occupancy of the second transit vehicle;
   determining an anticipated arrival location of the first transit vehicle within the transit station, wherein determining the anticipated arrival location of the first transit vehicle within the transit station comprises determining the anticipated arrival location of the first transit vehicle at a first portion of a plurality of portions of a platform within the transit station;
   determining an anticipated arrival location of the second transit vehicle within the transit station, wherein determining the anticipated arrival location of the second transit vehicle within the transit station comprises determining an anticipated arrival location of the second transit vehicle at a second portion of the plurality of portions of the platform within the transit station,
   transmitting the first indication to a first passenger notification device associated with the first portion of the platform within the transit station; and
   transmitting the second indication to a second passenger notification device associated with the second portion of the platform within the transit station;
   wherein prospective passengers are visually guided to the first portion and the second portion of the platform based on the first indication and the second indication when the first transit vehicle and the second transit vehicle arrive at the corresponding anticipated arrival location.

2. The method of claim 1, wherein at least one of the first sensor and the second sensor comprises a vehicle load weight sensor and the first sensor information comprises a measured weight of the first transit vehicle.

3. The method of claim 1, wherein at least one of the first sensor and the second sensor comprises at least one of a camera sensor, an infrared sensor, and a turnstile sensor.

4. The method of claim 1, wherein determining the estimated occupancy of the first transit vehicle comprises:
   comparing the first sensor information with one or more thresholds associated with defined vehicle occupancy levels; and
   assigning at least one defined vehicle occupancy level as the estimated occupancy of the first transit vehicle based on the comparison.

5. The method of claim 1, wherein the first transit vehicle and the second transit vehicle comprise at least one of a train car, a light rail car, a monorail car, a bus, a passenger vehicle, a boat, a ferry, a taxi vehicle, and a freight vehicle.

6. The method of claim 1, wherein the method further comprises: generating a first mobile device indication relating to the estimated occupancy of the first transit vehicle; and transmitting the first mobile device indication to a mobile electronic device associated with the prospective passengers.

7. The method of claim 6, wherein the first mobile device indication comprises a short message service message indicating the estimated occupancy of the first transit vehicle.

8. The method of claim 6, wherein the first mobile device indication comprises an application notification indicating the estimated occupancy of the first transit vehicle.

9. The method of claim 6, wherein the first mobile device indication comprises a transit service website notification indicating the estimated occupancy of the first transit vehicle.

10. The method of claim 1, wherein the first passenger notification device comprises a display associated with the transit station located proximate to the first portion of the platform within the transit station.

11. The method of claim 1, wherein the first passenger notification device comprises a first occupancy indication light located proximate to the first portion of the platform within the transit station.

12. The method of claim 11, wherein the first indication comprises a control signal to actuate the first occupancy indication light to display a first color associated with the estimated occupancy of the first transit vehicle.

13. The method of claim 1, wherein the method further comprises: receiving location information associated with the first transit vehicle;
   determining an estimated arrival time of the first transit vehicle at the transit station; and
   transmitting an indication of the estimated arrival time of the first vehicle to the first passenger notification device.

14. The method of claim 1, wherein the method further comprises: generating a second mobile device indication relating to the estimated occupancy of the second transit vehicle; and transmitting the second mobile device indication to a mobile electronic device associated with the passenger.

15. The method of claim 14, wherein the first passenger notification device comprises a first occupancy indication light located at the first portion of the platform within the transit station, the first indication comprises a control signal to actuate the first occupancy indication light to display a first color associated with the estimated occupancy of the first transit vehicle, the second passenger notification device comprises a second occupancy indication light located at the second portion of the platform within the transit station, and the second indication comprises a control signal to actuate the second occupancy indication light to display a second color associated with the estimated occupancy of the second transit vehicle, the second color being different than the first color.

16. The method of claim 1, wherein the first passenger notification device comprises an audible notification device.

* * * * *